United States Patent
Henry

[11] 4,222,668
[45] Sep. 16, 1980

[54] FERRIMAGNETIC FARADAY ELEMENTS FOR RING LASERS

[75] Inventor: Rodney D. Henry, Anaheim, Calif.

[73] Assignee: Rockwell International Corporation, El Segundo, Calif.

[21] Appl. No.: 880,408

[22] Filed: Feb. 23, 1978

[51] Int. Cl.$^2$ ............................ G01B 9/02; G01P 9/00
[52] U.S. Cl. ......................................... 356/350; 350/151
[58] Field of Search ........................... 356/350; 350/151

[56] References Cited

U.S. PATENT DOCUMENTS

| 3,890,047 | 6/1975 | Warner | 356/350 |
| 3,927,946 | 12/1975 | McClure | 356/350 |

OTHER PUBLICATIONS

"Ferrimagnetic Garnets as Laser Gyro Faraday Element;" Henry et al.; a paper presented at The Ninth Annual Electro-Optics & Laser Conference, Anaheim, California; Oct. 25, 1977.
"Fabrication of Thin Film Magnetic Garnet Structures for Intra-Cavity Laser Applications"; Whitcomb et al.; a paper presented to 23 Conference on Magnetism & Magnetic Materials; Nov. 8-11, 1977.
"Garnets with High Magnetooptic Figures of Merit in the Visible Region;" Lacklison et al.; "IEEE Transaction of Magnetics," vol. Mag. 9 #3; Sep. 73; pp. 457-460.
"Multilayer Magneto-Optic Structure;" Wieder; IBM Technical Disclosure Bulletin; vol. 15 #6; Nov. 72; p. 1792.

*Primary Examiner*—Vincent P. McGraw
*Attorney, Agent, or Firm*—H. Fredrick Hamann; Gilbert H. Friedman

[57] ABSTRACT

A ring laser having a Faraday cell for biasing the mode locking region beyond the range of rotation rates of interest. The Faraday element included in the cell is a composite comprising a monocrystalline thin film of a ferrimagnetic material epitaxially deposited on a non-magnetic single crystal substrate. An antireflection coating on the composite reduces reflections. Reflections are further reduced by the selection of thickness and index of refraction for the layers of the composite. Selected substituents are used in garnet layers to achieve desired magnetic properties, desired indices of refraction, and desired matching of the lattice parameter from layer to layer to minimize internal stresses. Where a composite is provided with a reflection coating on one side thereof, it is adapted to serve as an optical cavity forming corner reflector.

21 Claims, 3 Drawing Figures

FERRIMAGNETIC FARADAY ELEMENTS FOR RING LASERS

BACKGROUND OF THE INVENTION

1. Field of the Invention

The present invention relates generally to ring lasers and more particularly to ring lasers which may be used as gyroscopes to sense rate of rotation. Most particularly, the invention relates to ring lasers having a Faraday cell biasing system to prevent mode locking, or phase locking, at rotation rates which are within the range of interest.

2. Description of the Prior Art

In a ring laser gyro, an angular rate is measured by light waves traveling in a closed optical path commonly defined by three or four reflectors. Two laser beams, sustained by the optical gain provided by a gas discharge, propagate in clockwise and counterclockwise directions around the ring. With no rotation about the input axis, the frequencies of oscillation of the two counter-propagating beams are the same. Rotation of the gyro about its input axis (perpendicular to the plane of the enclosed optical path) in either direction causes an increase in cavity length for the beam traveling in the direction of rotation and a decrease in cavity length for the beam traveling against the direction of rotation.

Consequently, the frequency in each beam must shift slightly to maintain an integral number of wavelengths in each beam, a basic requirement to sustain laser oscillation. The frequencies of the two beams are then unequal by an amount proportional to the rotation rate of the gyro.

A beat signal is produced when the two counterrotating beams are properly combined. For rotation about an axis perpendicular to the plane of the cavity, the frequency of the beat signal will indicate the rotational rate applied to the cavity.

Ring lasers known in the art typically employ mechanical rotation or Faraday effect bias to separate the frequencies of counter-propagating laser beams sufficiently to prevent mode locking between the beams, particularly at low rotation rates. Periodic reversal of the bias, viz, modulation of the bias, is employed to minimize sensitivity to sources of bias drift and to provide partial cancellation of mode pulling and backscatter errors. The mechanical bias technique is undesirable from the standpoint of employing moving parts sensitive to the stresses of high acceleration. Modulation by periodic reversal of the magnetic field in a Faraday cell typically requires substantial amounts of electrical power and produces concomitant undesirable heating.

U.S. Pat. No. 3,617,129; Skolnick; Interferometric Optical Isolator describes a directional anisotropy as one which provides a different optical path length for waves travelling in opposite directions on an optical path. For instance, the directional anisotropy may comprise a Faraday rotator flanked by quarter-wave plates. As is known, the Faraday rotator comprises a suitable material with a proper axial magnetic flux therein. For instance, for light in the visible and near visible spectrums, quartz is suitable; for infra red radiation indium antiminide or gallium arsenide may be used.

U.S. Pat. No. 3,807,866; Zingery; Ring Laser Gyroscope Having a Constant Output Beat-Frequency states that the substance involved in producing the Faraday effect may be a material such as lithium silicate with a large percentage of terbium.

U.S. Pat. No. 3,826,575; Walter Jr.; High Performance Ring Laser Gyroscope with Magneto-Optical Bias states that the Faraday cell is a common device for achieving magneto-optical bias. It consists of two quarter-wave plates which enclose an optical medium with a relatively large Verdet constant. This optical medium is then surrounded by an electromagnet or a permanent magnet to produce the necessary magnetic field intensity. The optical medium rotates the polarization plane of polarized light passing through it. Quartz, for example, which does not normally have this rotational property, acquires it when placed in a strong magnetic field. For quartz, flint glass, or another similar substance, the Faraday rotation for a given wavelength of light is proportional to the magnetic field intensity. However, given a field of fixed intensity, every light transmissive material will produce an amount of Faraday rotation. This quality is generally indicated by the number called a Verdet constant, as mentioned above.

U.S. Pat. No. 3,890,047; Warner; Differential Laser Gyro Employing Reflection Polarization Anisotropy states that a Faraday cell may comprise any material with a suitable Verdet constant which is provided with a suitable magnetic field. The directional anisotropy of the Faraday cell is provided by the magnetic field in the material. The material may be fused quartz or a properly chosen glass.

Paramagnetic glasses have been used for Faraday elements. The paramagnetic glasses form a dilute matrix for certain ions, typically rare earth ions such as, for example, europium 3+ or gadolinium which give a relatively large Faraday rotation at a high magnetic field intensity. Faraday rotations of from 0.01 to 0.02 degrees are reasonably attainable using these materials.

However, these Faraday rotations are insufficient for many practical applications. Although the mode locking region can be readily shifted enough to measure angular rotation rates up to 30 degrees per second using prior art materials, many applications require the measurement of rotation rates of up to 100 degrees per second and beyond.

To produce a magnetic field intensity sufficiently large to bias a ring laser using a paramagnetic glass Faraday element beyond 100 degrees per second would require an inconveniently large magnet coil. In addition, such a coil would generate more heat than can be conveniently dissipated. Furthermore, if a magnetic shielding technique was being used to reduce or eliminate the effect of stray fields such as, for example, the earth's magnetic field, the required shielding would be inconveniently bulky. Such a ring laser would lose its compatibility with miniaturized solid-state components.

The most pertinent publications known to applicant are listed herewith.

Ito et al: LPE Films of Bismuth-Substituted Bubble Garnet, *IEEE Transactions on Magnetics*, Vol. MAG-9, No. 3, September 1973, pp. 460–463, which discusses the isothermal liquid-phase epitaxy of bismuth substituted garnet films on a gadolinium gallium garnet substrate.

U.S. Pat. No. 3,980,949; Feldtkeller; Magneto-Optical Measuring Transducer for Very High Currents/Voltages which discloses a magneto-optical measuring transducer comprising an yttrium iron garnet layer on a gadolinium gallium garnet plate and reflective layers on the garnet layers wherein the direction of polarization of a polarized beam of light is rotated in response to a magnetic field created by a current to be measured.

U.S. Pat. No. 3,927,946; McClure; Ring Laser Frequency Biasing Mechanism which describes a ring laser cavity forming component including a non-reciprocal phase shift inducing mirror comprising thin films of a high reflectivity multilayer dielectric and a magnetically saturable layer deposited on a substrate. The magnetically saturable layer is constructed of a ferromagnetic material such as iron, nickel, or cobalt. Non-reciprocal phase shift is based on the Kerr magneto-optic effect which is known to be lossier than the Faraday effect. McClure is hereby incorporated by reference into this specification in its entirety for its discussion of the general problem of mode locking in ring lasers and for its discussion of the secondary problems which must be accounted for or resolved in an operational ring laser instrument.

U.S. Pat. No. 3,851,973; Macek; Ring Laser Magnetic Bias Mirror Compensated For Non-Reciprocal Loss which discloses a multilayer dielectric mirror for use with the magneto-optic device of McClure, discussed above, wherein at least one layer of the multilayer dielectric mirror has a thickness adjusted to eliminate non-reciprocal loss (or differential reflection).

R. D. Henry et al, "Bubble Dynamics in Multilayer Garnet Films," *J. Appl. Phys.*, August 1976, 47, 3702, discloses a multilayer garnet film structure in which three layers of yttrium iron garnet are successively deposited by liquid phase epitaxy.

R. D. Henry et al, "Ferrimagnetic Garnets as Laser Gyro Faraday Elements," "Proceedings of the Technical Program, ElectroOptics/Laser 77 Conference & Exposition," Anaheim, Calif. Oct. 25, 26, 27, 1977, Industrial and Scientific Conference Management, Inc., 222 West Adams St., Chicago, Ill. 60606, which discloses and describes various embodiments of the invention disclosed in this specification. This paper is hereby incorporated by reference into this specification in its entirety.

E. C. Whitcomb et al, "Fabrication of Thin Film Magnetic Garnet Structures for Intra-Cavity Laser Applications," a paper presented to the 23rd Conference on Magnetism and Magnetic Materials, Nov. 8–11, 1977, Minneapolis, Minn., and published in *Journal of Applied Physics*, 49 (3), p. 1803, March 1978, which discusses the variation of the index of refraction of yttrium iron garnet by varying the iron to gallium ratio therein. This paper is hereby incorporated by reference into this specification in its entirety.

SUMMARY OF THE INVENTION

This invention is directed to a new Faraday element suitable for use in a Faraday cell biasing system for ring lasers. The Faraday element according to the invention provides relatively high Faraday rotation due to magnetic circular birefringence at relatively low magnetic field intensities. This characteristic reduces the amount of magnetic bias required and further tends to reduce heat dissipation where the source of the magnetic bias to an electromagnet. In addition, contrary to the situation where paramagnetic glasses are used, the Faraday substance of this invention is not only saturable, it may have a low saturation magnetization. This Faraday substance may be magnetically saturated at a magnetic field intensity less than or approximately equal to the earth's magnetic field. The applied magnetic field may be made greater than the earth's field by about an order of magnitude or more. Therefore, variations in the earth's magentic field may be made to have an insignificant effect on the Faraday bias. In this case, the need for magnetic shielding or any other technique for avoiding the effect of stray magnetic fields is obviated. In addition, since the saturation magnetization of the Faraday element of this invention can be made very low, relatively little power is required to modulate the Faraday bias to produce a signal which is independent of effects causing drifts such as temperature variations.

These advantages and others are achieved in a Faraday element comprising a substrate of a non-magnetic (diamagnetic or paramagnetic) garnet on which is epitaxially deposited a thin film of a ferrimagnetic material such as, for example, a ferrimagnetic garnet. The substrate is preferably cut from a single crystal of gadolinium gallium garnet. The ferrimagnetic garnet is preferably monocrystalline yttrium iron garnet having substituents therein to adjust the saturation magnetization, index of refraction, and lattice parameter of the material to selected values. Gallium is substituted for iron in the garnet to reduce the saturation magnetization to a selected low level. The amount of gallium used also varies and determines the index of refraction. Substituents selected from the group consisting of gadolinium, lanthanum, and bismuth are substituted for the yttrium in the garnet to cause the lattice parameter of the film to match that of the substrate or an adjacent film.

In a Faraday element comprising a thin film of ferrimagnetic material and a substrate, reflection will tend to occur at the interfaces between materials having different indices of refraction. Such reflections introduce undesirable losses into the system. Therefore, in practicing the invention, the number of layers of material chosen for the composite Faraday element and the thickness of these layers is based on minimization of reflection. In addition, certain layers may be added to the composite for the primary purpose of reducing such reflection and for reducing the dependence of antireflection properties on precise thickness control of the layers.

As a general matter, Faraday elements in accordance with this invention may be used as light transmissive elements. However, when these Faraday elements are provided with a proper reflection coating, they may serve a dual purpose—that of Faraday element for introducing frequency bias and that of corner reflector for defining the optical cavity.

BRIEF DESCRIPTION OF THE DRAWINGS

Like reference numerals designate like parts throughout the figures.

DESCRIPTION OF THE PREFERRED EMBODIMENTS

Figure 1:
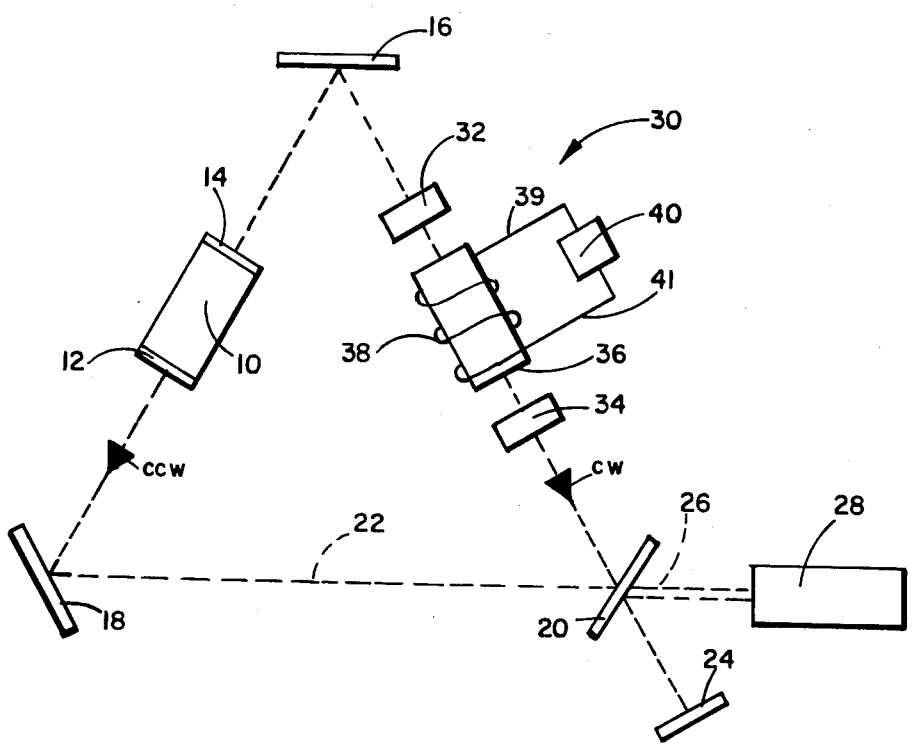
FIG. 1 is a schematic diagram of a ring laser having a transmissive Faraday cell in accordance with the instant invention.

Referring to FIG. 1, an active lasing medium, such as the standard helium-neon gas mixture energized by conventional r.f. means (not shown), contained within glass tube 10 emits light waves in both directions along its longitudinal axis through partially transmissive mirrors 12 and 14 sealing both ends of the tube 10. Optical cavity forming reflectors 16, 18 and 20 successively reflect the contradirectional light waves around a closed loop path 22. Laser mirrors 12 and 14 are polarization selective. Thus both the clockwise (cw) and the counterclockwise (ccw) light waves will be plane polarized with the same polarization which may be, for example, perpendicular to the plane of the optical cavity.

FIG. 1, the three reflectors 16, 18 and 20 have been illustrated as first surfaced mirrors. However, the term reflector as used throughout the specification includes any suitable means for changing the direction of travel of the counter-propagating beams through fixed angles. Hence the term reflector embraces also second surfaced mirrors, prisms, and the like.

Reflector 20 is preferably partially transmissive, for example 5% transmissive, in order to provide an exit port for light energy circulating in the optical loop 22. Reflector 24, which is positioned at right angles to the direction of the path from reflector 16 to reflector 20, represents means for causing light energy derived from the two counter-propagating beams to exit along parallel paths as shown at 26. At a receiver 28, light energy from the two beams is mixed, an electrical signal at the beat frequency of the two beams is detected and its pulses are counted to give a proportional measure of the rotation rate of the optical cavity.

A Faraday cell 30 in accordance with the invention is positioned in the optical cavity of the ring laser of FIG. 1 to produce a frequency bias between the counter-propagating light beams therein. As is well known, each of two preferably matched quarter-wave plates 32 and 34 converts plane polarized light incident upon the Faraday cell 30 into circularly polarized light. The two circularly polarized light beams counter-propagating through the Faraday element 36 are subjected to non-reciprocal phase shift due to the magnetic circular birefringence of the material and are then reconverted to plane polarized light as they exit Faraday cell 30 through quarter-wave plates 32 and 34. Non-reciprocal phase shift is phase shift which is equal in magnitude but opposite in sign for two counter-propagating waves having the same circular polarization.

Means for applying a magnetic field to the Faraday element 36 are represented in FIG. 1 by a coil 38 oriented to apply the magnetic field intensity along the longitudinal axis of Faraday element 36. This orientation is preferred but not required. The magnetization may be at any acute angle relative to the light beams. So long as there is a component of the magnetization along the line of propagation of the light beams, non-reciprocal phase shift will occur. The means for applying a magnetic field include a power source 40 connected to the coil 38 by conductors 39 and 41. Power source 40 may be a DC source for producing a constant bias or an alternating source having, for example, a square waveform for producing a modulated bias.

Figure 2:
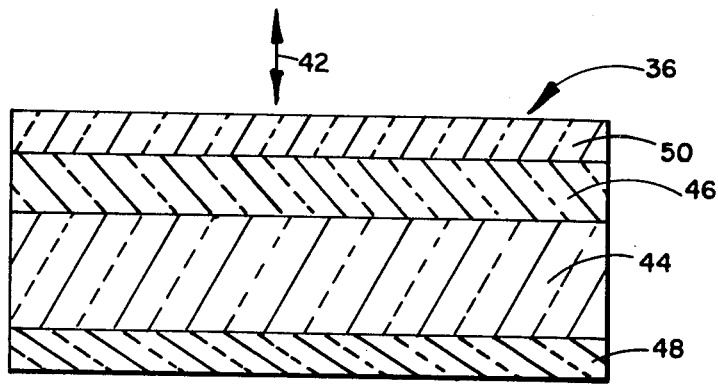
FIG. 2. is a cross-sectional view of a transmission Faraday element having a single epitaxially deposited layer.

A transmission Faraday element is accordance with the instant invention and suitable for use as the Faraday element 36 in the ring laser of FIG. 1 is shown in greater detail in FIG. 2.

A substrate 44 is cut from a single crystal of a nonmagnetic (diamagnetic or paramagnetic) garnet such as, for example, gadolinium gallium garnet which is preferred. Disposed on top of the substrate 44 is a layer 46 of a monocrystalline ferrimagnetic material such as, for example, yttrium iron garnet which is preferred. The layer 46 is preferably deposited on the substrate 44 by the method of liquid phase epitaxy.

Typically, light is transmitted through the Faraday element in the general directions indicated by the double-ended arrow 42, i.e., perpendicular to the plane of the layer 46. These same directions are the typical directions for the magnetization in the ferrimagnetic layer 46. However, the only requirement is that the magnetization and direction of light propagation may not be orthogonal.

Gallium is preferably substituted for a certain portion of the iron in the yttrium iron garnet of the layer 46 to greatly reduce the saturation magnetization. This serves a dual purpose. First, a relatively small magnetizing force is made sufficient to hold the ferrimagnetic material in saturation and relatively free of the effects of stray fields such as the earth's magnetic field. Second, modulation of the bias by reversing the magnetization cyclically to remove the effects of drifts due to such factors as temperature variations requires comparatively little power. This is because the magnitude of the flux reversal required is made small.

As is well known, the reduction of saturation magnetization in YIG has little or no effect on the magnetic circular birefringent properties of the material at wavelengths of about one micron and above. Thus, the film 46 is as effective to produce non-reciprocal phase shift in the counter-propagating light beams at the longer wavelengths as if the saturation magnetization had been left relatively high. At shorter wavelengths, there is an appreciable reduction in the magnetic circular birefringent properties of YIG when saturation magnetization is reduced. However, the material is still usable for practicing the invention at these shorter wavelengths. This phenomenon is discussed in H. Mathews et al, "Sublattice Contribution to the Infrared Rotary Dispersion in YIG," *Appl. Phys. Lett.*, 7, 165 (1965).

In addition to doping the film 46 with gallium for reducing saturation magnetization, the film 46 of ferrimagnetic material is also preferably doped with an appropriate amount of a substituent for yttrium selected from the group consisting of gadolinium, lanthanum and bismuth. This is for the purpose of matching the lattice parameter of the film 46 to that of the substrate 44. By producing a reasonable match of lattice parameters, stresses in the film 46 are minimized thus allowing the composite structure to remain mechanically stable.

A serious problem can arise when composite objects such as the Faraday element 36 are inserted into a ring laser optical cavity. The mismatch of indices of refraction across boundaries causes reflections which introduce losses into the operation of the laser and tend to widen the mode locking region. This is contrary to the intent of the invention. Therefore, in the preferred embodiment of this invention, steps are taken to minimize the occurrence of reflections from Faraday elements.

First, the epitaxial layer 46 of ferrimagnetic material is preferably deposited to have an optical thickness equal to one-half of the wavelength of the light in the beams when propagating in the layer 46. As is well known, the boundaries of such a half-wave layer will be reflectionless. In addition, an antireflection coating 48 is preferably deposited on the lower side of the substrate 44 and another antireflection coating 50 is preferably deposited on the upper side of the ferrimagnetic film 46. The fabrication of such antireflection coatings is well known to those skilled in the art.

As a fortuitous circumstance, antireflection coatings 48 and 50 may be fabricated very simply in the case of the preferred embodiment. The index of refraction of gadolinium gallium garnet is 1.945. The index of refraction of magnesium fluoride, a well known optical coating material, is 1.38. The latter index is approximately the square root of the former. As is well known, in such a case, a single layer of the magnesium fluoride one-quarter wavelength in optical thickness will antireflection coat the substrate satisfactorily at a boundary with air. However, for this to be so, the one-quarter wavelength optical thickness of the coating layers 48 and 50 must be very closely realized. The same is true for the optical thickness of the layer 46 of ferrimagnetic material which, as has been stated, is required to be one-half wavelength.

Figure 3:
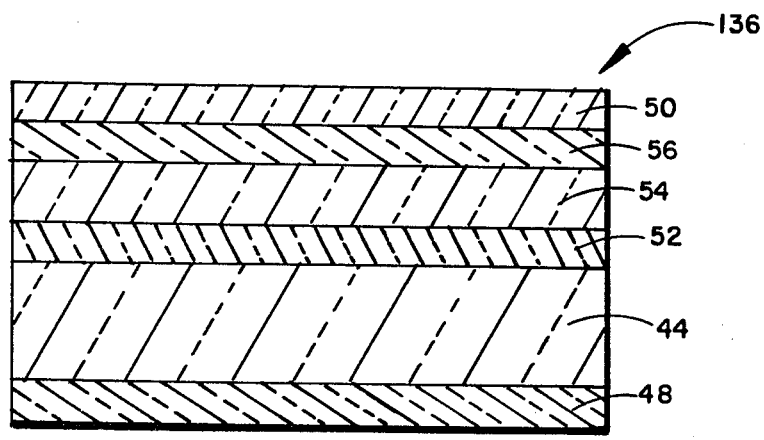
FIG. 3 is a cross-sectional view of a transmission Faraday element having three epitaxially deposited layers.

Relatively slight deviations of the thickness of the ferrimagnetic garnet layer 46 and of the thickness of the antireflection coatings 48 and 50 from their specified value in the Faraday element 36 can greatly increase undesirable reflection from the interfaces in the composite. Therefore, it may often prove to be advantageous to employ a Faraday element 136 such as is illustrated in FIG. 3 to replace Faraday element 36 in the ring laser of FIG. 1.

The Faraday element 136 comprises a substrate 44 cut from a single crystal of a suitable material. As stated above, the preferred material is gadolinium gallium garnet. A three-layer subcomposite of monocrystalline material is deposited on the substrate 44, preferably by the method of liquid phase epitaxy. The three-layer subcomposite comprises the layers 52 and 56 of a paramagnetic material and the intervening layer 54 of a ferrimagnetic material. Layers 52 and 56 are preferably of gallium-substituted yttrium iron garnet having a sufficient amount of gallium substituted therein to suppress the Curie point below the intended temperature of operation. Layers 52 and 56 have an optical thickness controlled to be approximately one-quarter wavelength of the light beams propagating in the material and have a refractive index chosen to minimize reflections of the composite.

The chosen refractive index is obtained in paramagnetic layers 52 and 56 by further adjusting the amount of gallium substituent included in the yttrium iron garnet. As is well known in the art, the proper choice of index of refraction for layers 52 and 56 is the square root of the product of the refractive indices of the substrate 44 material and the ferrimagnetic layer 54 material. For example, for a substrate 44 of gadolinium gallium garnet having an index of refraction of 1.945 and a ferrimagnetic layer 54 having an index of refraction of 2.11, the proper choice of index of refraction for paramagnetic layers 52 and 56, disposed as shown in FIG. 3, is about 2.03 for minimization of reflections from the composite. Following this choice of index of refraction permits variations in thickness in the several layers 50, 52, 54 and 56 on the order of about 10% without significant increase in reflection.

The layer 54 is a layer of ferrimagnetic material, preferably gallium-substituted yttrium iron garnet, having its saturation magnetization determined to be very low by the controlled amount of gallium doping used. The optical thickness of the layer 54 is controlled to be approximately one-half of the wavelength of the light beams propagating in the material or any multiple of one-half wavelength for minimization of reflections from the composite.

As is well known, such a three-layer structure as has been described for Faraday element 136 does not reflect light and, in addition, its antireflection characteristic is much less sensitive to deviations of layer optical thickness from the nominally desired values than is the single-layer structure of Faraday element 36.

In addition to the gallium doping, each of the three layers 52, 54 and 56 in the subcomposite is also doped with a substituent selected from the group consisting of gadolinium, lanthanum, and bismuth to bring about matching of the lattice parameters of the three layers among themselves and with respect to the substrate.

Figure 4:
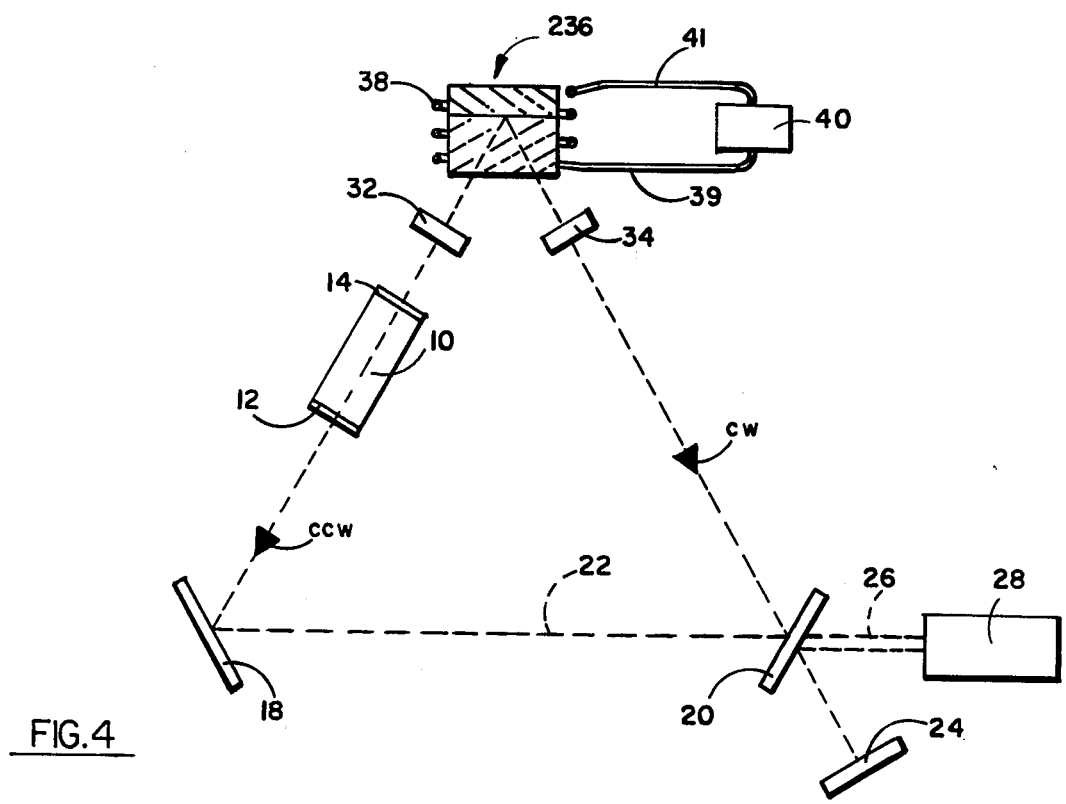
FIG. 4 is a schematic diagram of a ring laser having a reflective Faraday cell in accordance with the instant invention.

FIG. 4 shows a ring laser similar in most respects to the ring laser of FIG. 1. The outstanding exception is that a Faraday cell 230 for biasing the frequencies of the counterpropagating light beams exiting laser plasma tube 10 utilizes its Faraday element 236 as a corner reflector for the optical cavity as well. The Faraday element 236 is shown in the interior of its magnetizing coil 38, both of which are shown here in cross-section.

Figure 5:
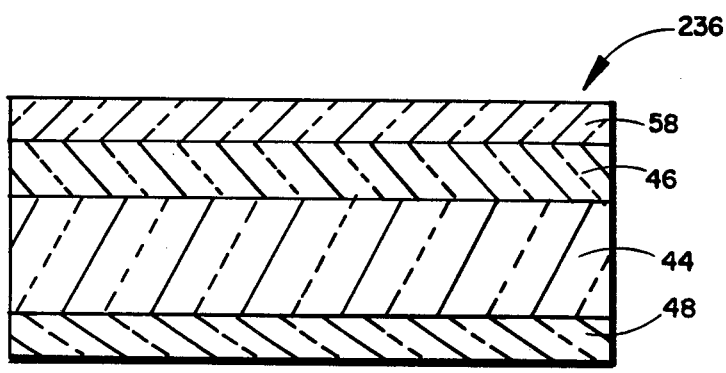
FIG. 5 is a cross-sectional view of a reflection Faraday element having a single epitaxially deposited layer.

The Faraday element 236 is shown in greater detail in FIG. 5. It comprises a substrate 44 of, preferably, gadolinium gallium garnet having an epitaxially deposited layer 46 of, preferably, gallium-substituted yttrium iron garnet thereon. As in the embodiment of FIG. 2, the lower side of the substrate 44 has an antireflection coating 48 thereon. The significant difference between Faraday element 236 and Faraday element 36 of FIG. 2 is that the layer 58 on top of layer 46 is a reflection, or mirror, coating. The layer 58 reflects light which reaches it through ferrimagnetic layer 46 back through the same layer 46.

Even though Faraday element 236 is used as a corner reflector, it is desirable that the light be primarily reflected from reflection coating layer 58 rather than from other layers so that all or most of the light traversing the Faraday element experiences the non-reciprocal phase shift in the layer 46. Therefore, it is useful to retain antireflection coating 48 in the embodiment of FIG. 5. Ferrimagnetic layer 46 is also retained at a half-wavelength thickness for the same reason.

Figure 6:
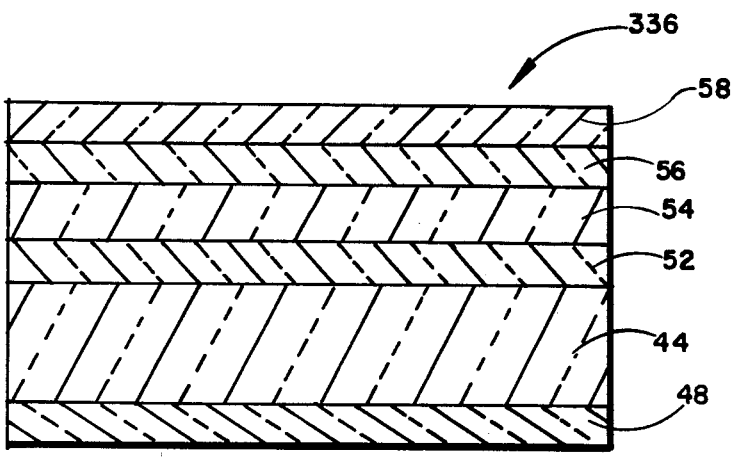
FIG. 6 is a cross-sectional view of a reflection Faraday element having three epitaxially deposited layers.

The design of Faraday element 136 of FIG. 3 may be modified by replacing antireflection coating 50 with a reflection coating. This modification is illustrated in FIG. 6 wherein Faraday element 336 is a three-epitaxial-layer composite having a reflection coating 58. Faraday element 336 is adapted to serve as a corner reflector in the ring laser of FIG. 4.

Thus, there has been shown and described an improved Faraday element useful in Faraday cell biasing systems for ring lasers. Those skilled in the art will conceive of modifications to the specific details shown and described. For example, where various layers in composites have been described as having an optical thickness of, for example, a quarter-wavelength or a half-wavelength, the particular layers so described may also have a thickness which is some multiple of the thickness designated. This is well known to those skilled in the art. However, any such modifications which fall within the purview of this description are intended to be included therein. That is, this description is intended to be illustrative only and not to be limitative. The scope of the invention is limited only by the claims appended hereto.

Having thus described preferred embodiments of the invention, what is claimed is:

1. A ring laser comprising:
    an optical cavity formed as a closed path describing a ring;
    light amplifier means disposed in said optical cavity for producing at least two linearly polarized light beams counter-propagating around said ring;
    Faraday cell means for producing a relatively large frequency difference between said at least two light beams at relatively small rotation rates of said ring; said Faraday cell comprising:
        first and second quarter-wave plate means for changing the polarization of said at least two light beams from linear polarization to circular polarization where said at least two light beams are incident upon said Faraday cell and for changing the polarization of said at least two light beams from circular polarization to linear polarization where said at least two light beams exit from said Faraday cell; and
        thin film Faraday element means of ferrimagnetic material interposed between said first and second quarter-wave plate means for interacting with said at least two light beams wherein said ferrimagnetic material exhibits circular magnetic birefringence and thereby induces non-reciprocal phase shift in said at least two light beams;
    wherein said thin film Faraday element means comprises:
        a single crystal substrate of a non-magnetic material; and
        a thin monocrystalline film of said ferrimagnetic material epitaxially deposited on said substrate, wherein the optical thickness of said thin film of said ferrimagnetic material is any odd multiple of one-half of a wavelength of the light of said light beams propagating in said ferrimagnetic material.

2. A ring laser as recited in claim 1 wherein said non-reciprocal phase shift induced in a clockwise propagating one of said at least two light beams is equal in magnitude and opposite in sign to said non-reciprocal phase shift induced in a counterclockwise propagating one of said at least two light beams.

3. A ring laser as recited in claim 2 wherein said ferrimagnetic material of said thin film Faraday element is a ferrimagnetic garnet.

4. A ring laser is recited in claim 3 wherein said ferrimagnetic garnet is a thin film of monocrystalline ferrimagnetic yttrium iron garnet.

5. A ring laser as recited in claim 4 wherein said ferrimagnetic yttrium iron garnet has a selected quantity of gallium substituted for iron therein to give said garnet a selected index of refraction and a selected relatively low saturation magnetization.

6. A ring laser as recited in claim 5 wherein said ferrimagnetic yttrium iron garnet has a selected quantity of an element selected from the group consisting of gadolinium, lanthanum, and bismuth substituted for yttrium therein to give said garnet a selected lattice parameter.

7. A ring laser as recited in claim 6 wherein said single crystal substrate is of a non-magnetic garnet.

8. A ring laser as recited in claim 7 wherein said lattice parameter selected for said ferrimagnetic yttrium iron garnet is selected to match the lattice parameter of said non-magnetic garnet.

9. A ring laser as recited in claim 8 wherein said non-magnetic garnet is gadolinium gallium garnet.

10. A ring laser as recited in claim 1 wherein said thin film Faraday element means is disposed in said optical cavity interposed between adjacent optical cavity forming corner reflectors of said cavity wherein each of said at least two light beams is transmitted through said thin film once for each passage of said light beams around said ring.

11. A ring laser as recited in claim 1 wherein said thin film Faraday element means comprises a cavity forming reflector disposed at a corner of said ring to receive light transmitted through said thin film of ferrimagnetic material and to reflect said light back through said thin film of ferrimagnetic material wherein each of said at least two light beams is transmitted through and reflected back through said thin film of ferrimagnetic material once for each passage of said light beams around said ring.

12. A ring laser as recited in claim 6 wherein said thin film Faraday element means comprises:
    said single crystal substrate of a non-magnetic garnet,
    a first thin film of monocrystalline paramagnetic yttrium iron garnet epitaxially deposited on a first surface of said substrate;
    said thin film of monocrystalline ferrimagnetic yttrium iron garnet epitaxially deposited on said first thin film of monocrystalline paramagnetic yttrium iron garnet; and
    a second thin film of monocrystalline paramagnetic yttrium iron garnet epitaxially deposited on said thin film of monocrystalline ferrimagnetic yttrium iron garnet.

13. A ring laser as recited in claim 12 wherein said first and second thin films of monocrystalline paramagnetic yttrium iron garnet each have a selected quantity of gallium substituted for iron therein to give said garnet a selected index of refraction and paramagnetic properites.

14. A ring laser as recited in claim 13 wherein said first thin film of monocrystalline paramagnetic yttrium iron garnet has a selected quantity of an element selected from the group consisting of gadolinium, lanthanum, and bismuth substituted for yttrium therein to give said garnet a lattice parameter matched to the lattice parameter of said non-magnetic garnet substrate.

15. A ring laser as recited in claim 14 wherein said non-magnetic garnet is gadolinium gallium garnet.

16. A ring laser as recited in claim 15 wherein said lattice parameter selected for said ferrimagnetic yttrium iron garnet is selected to match the lattice parameter of said first thin film of monocrystalline paramagnetic yttrium iron garnet.

17. A ring laser as recited in claim 16 wherein said second thin film of monocrystalline paramagnetic yttrium iron garnet has a selected quantity of an element selected from the group consisting of gadolinium, lanthanum, and bismuth substituted for yttrium therein to give said garnet a lattice parameter matched to the lattice parameter of said thin film of monocrystalline ferrimagnetic yttrium iron garnet.

18. A ring laser as recited in claim 17 wherein said first and second thin films of monocrystalline paramagnetic yttrium iron garnet each have an optical thickness substantially equal to an odd multiple of one-quarter of a wavelength of the light of said light beams propagating in said thin film of paramagnetic yttrium iron garnet.

19. A ring laser as recited in claim 2, wherein said Faraday element means further comprises an antireflection coating formed on each outer surface of said Faraday element means at which light enters said Faraday element, and wherein the optical thickness of said antireflection coating is any odd multiple of one-quarter of a wavelength of the light of said light beams.

20. A ring laser as recited in claim 9, wherein said antireflection coating is of magnesium fluoride.

21. A ring laser as recited in claim 18, wherein said antireflection coating is of magnesium fluoride.

* * * * *

UNITED STATES PATENT AND TRADEMARK OFFICE
CERTIFICATE OF CORRECTION

PATENT NO. : 4,222,668
DATED : September 16, 1980
INVENTOR(S) : Rodney D. Henry

It is certified that error appears in the above-identified patent and that said Letters Patent are hereby corrected as shown below:

Column 1, line 46, change "viz," to -- viz., --.

Column 3, line 61, change "to an" to -- is an --.

Column 5, line 17, change "FIG." to -- In FIG. --.

Column 11, line 1, change "an" to -- any --.

Signed and Sealed this

Tenth Day of February 1981

[SEAL]

*Attest:*

RENE D. TEGTMEYER

*Attesting Officer*     *Acting Commissioner of Patents and Trademarks*